United States Patent Office 3,523,123
Patented Aug. 4, 1970

3,523,123
NOVEL OXAZOLINES AND IMIDAZOLINES
AND PROCESS THEREFOR
Herbert L. Wehrmeister, Terre Haute, Ind., assignor to Commercial Solvents Corporation, New York, N.Y., a corporation of Maryland
No Drawing. Continuation of application Ser. No. 614,034, Feb. 6, 1967, which is a continuation-in-part of application Ser. No. 254,010, Jan. 25, 1963. This application Mar. 17, 1969, Ser. No. 808,389
Int. Cl. C07d 85/38
U.S. Cl. 260—307                    2 Claims

ABSTRACT OF THE DISCLOSURE

Compounds, and process for the preparation thereof, of the class of 2-substituted oxazolines and imidazolines useful as pigment wetting agents, surface active agents, corrosion inhibitors and intermediates prepared by condensing oxazolines and imidazolines with an aldehyde. Typical compounds include 2-(1-hydroxyalkyl)-2-oxazolines and imidazolines; 2-[1,1-bis(hydroxymethyl)-methyl-2-oxazolines and imidazolines; and 2-[1,1,1-tris(hydroxymethyl)methyl]-2-oxazolines and imidazolines. A process for oxazoline and imidazoline compounds by reacting oxazolines or imidazolines with an organic carbonyl compound having the formula R"CHO in the absence of an added catalyst at 20–200° C.

CROSS REFERENCE TO RELATED APPLICATION

This application is a continuation of S.N. 614,034, filed Feb. 6, 1967, which is a continuation-in-part of S.N. 254,010, filed Jan. 25, 1963, both of which are now abandoned.

BRIEF SUMMARY OF THE INVENTION

This invention relates to a process for producing oxazoline and imidazoline derivatives. In a particular aspect it relates to a process for producing 2-substituted oxazoline and imidazoline derivatives having from 1 to 3 hydroxyalkyl groups or arylhydroxyalkyl groups substituted on the α-carbon atom, i.e. the carbon atom attached to the carbon atom in the 2-position in the ring, and to an improved process for the production of α-vinyl oxazolines and imidazolines.

2-substituted-2-oxazolines and imidazolines are well-known compounds available in commercial quantities. Previously, however, the substituent in the 2-position has usually been alkyl, alkenyl or aryl. Their preparations are described respectively by Tryon, U.S. Pat. 2,372,490 and Riebsomer, J. Am. Chem. Soc. 70, 1629–32 (1948). Oxazolines having one or two hydroxyalkyl groups in the 4-position are also well known, but 2-oxazolines and 2-imidazolines having hydroxyalkyl and arylhydroxyalkyl groups substituted on the α-carbon atom have not previously been known.

The hydroxy-derivatives produced by the present invention are useful as pigment wetting agents, surface active agents, corrosion inhibitors and as intermediates in the preparation of other products.

Vinyl oxazolines, i.e. 2-alkyl and 2-alkenyl-2-oxazolines having a =CH₂ group substituted on the α-carbon atom, are also known in the art. Purcell, U.S. Pat. 3,248,397, describes their preparation by reacting a 2-alkyl-2-oxazoline, or 2-alkenyl-2-oxazoline, with formaldehyde in a 1:1 mole ratio as taught by Jordan et al. U.S. 2,559,440. The products obtained thereby, especially those wherein the alkenyl group is supplied by linseed fatty acids, are particularly useful as drying oils in paints, varnishes, enamels, etc., and in the preparation of polymers and copolymers. In this process the conversion of alkenyl oxazoline to vinyl-alkenyl-oxazoline was seldom higher than about 50–60%, so that a purification step was usually required to obtain a satisfactory final product.

It is an object of this invention to provide a method for the production of oxazoline and imidazoline derivatives.

Anther object of this invention is to provide 2-hydroxyalkyl-2-oxazolines and imidazolines and 2-arylhydroxyalkyl-2-oxazolines and imidazolines.

A second object of this invention is to provide an improved method for the production of vinyl oxazolines and imidazolines.

Other objects of this invention will be apparent to those skilled in the art from the description herein.

One object of the present invention is the provision of novel oxazoline and imidazoline products, the Group I oxazolines and imidazolines, corresponding to the formula

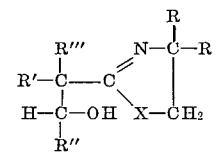

wherein R can be hydrogen, alkyl, e.g. lower alkyl of from 1 to about 3 carbon atoms, or hydroxyalkyl, e.g. hydroxy-lower alkyl of from 1 to about 3 carbon atoms, and monocarboxylic acid esters thereof;

R''' can be hydrogen or alkyl, e.g. lower alkyl of from 1 to about 3 carbon atoms, or hydroxyalkyl, e.g. hydroxy-lower alkyl of from 1 to about 3 carbon atoms;

R" can be hydrogen, alkyl of 1 to 15 carbon atoms, or aryl, e.g. phenyl, including substituted, e.g. halogen-, hydroxy-, dimethylamino-, or nitro-substituted;

R' can be H, alkyl or alkenyl, e.g. alkyl or alkenyl of from 1 to about 20 carbon atoms, hydroxyalkyl, e.g. lower hydroxyalkyl of from 1 to about 3 carbon atoms, or aryl, e.g. phenyl;

X can be

wherein Y is alkyl, e.g. lower alkyl of from 1 to about 3 carbon atoms, hydroxy-alkyl, e.g. hydroxy-lower alkyl of from 1 to about 3 carbon atoms, or aryl, e.g. phenyl.

These compounds, i.e. the Group I oxazolines and imidazolines, can be prepared by reacting a compound corresponding to the formula

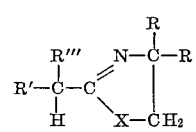

wherein X, R, R' and R''' have the same meaning set forth above (henceforth to be referred to as the Group II oxazoline and imidazoline compounds), with an organic carbonyl compound under condensing conditions to condense the carbonyl group of the carbonyl compound with the —CH— radical attached to the 2-position of the oxazoline or imidazoline compound. When R' and R''' are hydrogen, from 1 to 3 moles of the carbonyl compound are condensed with oxazoline or imidazoline as desired; when only 1 of R' or R''' is hydrogen, 1 or 2 moles of carbonyl compound can be condensed as desired; and if neither R' nor R''' is hydrogen, only one mole can be condensed.

A second object of the present invention includes the provision of an improved method for the production of vinyl oxazoline and imidazoline compounds, Compounds A, the Group III oxazolines and imidazolines corresponding to the formula

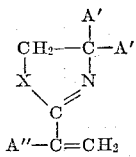

wherein X (as set forth above) can be —O— (the oxygen in an oxazoline ring) or

(the nitrogen in an imidazoline ring) where Y (as set forth above) is alkyl, e.g. lower alkyl, hydroxyalkyl, e.g. hydroxy-lower alkyl, or monocyclic aryl;

A' can be hydrogen, alkyl, e.g. lower alkyl of from 1 to about 3 carbon atoms, or hydroxyalkyl, e.g. lower hydroxyalkyl of from 1 to about 3 carbon atoms, and saturated or unsaturated monocarboxylic acid esters thereof;

And A" can be hydrogen, alkyl of from 1 to about 20 carbon atoms, alkenyl of from 2 to about 20 carbon atoms, or aryl, e.g. phenyl.

The Group III compounds, the vinyl oxazolines and imidazolines, are prepared by an improved process whereby the 2-[1,1-bis(hydroxymethyl)] compounds of Group I (i.e. compounds wherein R''' is hydroxymethyl, also known as α,α-bis-hydroxymethyl compounds) are heated at a temperature of from above about 125° C., i.e. to from about 125° C. to about 250° C., preferably from 160° C. to 200° C. for a period of time sufficient to effect the removal of one molecule of water and one molecule of formaldehyde per mole of oxazoline or imidazoline. This process provides increased conversion of oxazoline of imidazoline to the vinyl derivative. The improved process gives conversions generally in the range of from about 75 to about 80% whereas conversions in the prior process generally were in the range of about 50-60%.

DETAILED DESCRIPTION

In the preferred embodiment of the first object of this invention, a mole ratio of about 1.1 of carbonyl compound per mole of oxazoline or imidazoline generally gives the best yields when compounds having one α-hydroxy group are being prepared. When α,α-bis-hydroxy compounds are being prepared, the preferred ratio is about 2.2 moles of carbonyl compound per mole of oxazoline or imidazoline, and when the α,α,α-tris-hydroxy derivative is being prepared, the carbonyl compound generally is present in a ratio of about 3.3 moles or more per mole of oxazoline or imidazoline.

When the tris-hydroxy derivative is being prepared, the oxazoline or imidazoline is selected so that in the formula for Group I compounds, R' is hydrogen and R''' is hydrogen. When the bis-hydroxy derivative is being prepared, the oxazoline or imidazoline is selected so that either or both R' and R''' are hydrogen.

In the process of this invention, the Group II oxazoline or imidazoline is charged to a reaction vessel fitted with a reflux condenser and a take-off head. A solvent can be added if desired in a volume approximately equal to the volume of oxazoline or imidazoline, and a solvent which forms an azeotrope with water is preferred. Suitable solvents include the aromatic hydrocarbons, e.g. benzene, toluene and xylene. The carbonyl compound selected to provide the desired product is then added in a mole ratio which is predetermined to give the mono-hydroxy, the bis-hydroxy, or the tris-hydroxy compound of this invention, as previously described. The mixture is then heated to about 100° C. until all of the aldehyde is dissolved, and heating is continued under reflux conditions including heating at a temperature of from about 20° C. to about 160° C., preferably from about 90° C. to about 150° C. A particularly preferred temperature range is from about 95° C. to about 125° C. If a solvent is used, the solvent is continuously returned to the reaction vessel. At the end of the heating period the solvent is distilled from the reaction mixture.

The heating period is continued until condensation at the α-carbon atom has been effected, e.g. for about 4 to about 20 hours at from about 95 to about 125° C. One method of determining the progress of the reaction is to monitor the consumption of formaldehyde by taking period samples and determining residual aldehyde by known methods.

The crude pot residue containing the product is satisfactory for most uses without purification. When preferred, however, the product is purified by distillation at low pressure, e.g. at a pressure which will provide distillation at a temperature less than about 125° C., a pressure of 20 mm. or less, for example. In many instances the compounds of this invention can also be purified by recrystallization from a suitable solvent.

Among the Group II oxazoline and imidazoline compounds useable in the preparation of the Group I compounds of this invention are 1-isopropyl-2-ethyl-4,4-dimethyl-2-imidazoline;
1-phenyl-2-ethyl-4,4-dimethyl-2-imidazoline;
1-(2-hydroxyethyl)-2-ethyl-4,4-dimethyl-2-imidazoline;
2-ethyl-4,4-dimethyl-2-oxazoline;
2-propyl-4,4-dimethyl-2-oxazoline;
2-benzyl-4-methyl-4-hydroxymethyl-2-oxazoline;
2-methyl-4,4-bis(hydroxymethyl)-2-oxazoline;
2,4,4-trimethyl-2-oxazoline;
2-ethyl-2-oxazoline;
2-(1-methylethyl)-4,4-dimethyl-2-oxazoline;
2-ethyl-4-methyl-4-hydroxymethyl-2-oxazoline;
2-heptadecenyl-4-methyl-4-hydroxymethyl-2-oxazoline;
1-benzyl-2-ethyl-4,4-dimethyl-2-imidazoline;
1-phenyl-2-ethyl-4,4-dimethyl-2-imidazoline;
1-hydroxyethyl-2-ethyl-4,4-dimethyl-2-imidazoline;
2-methyl-4,4-bis(acetoxymethyl)-2-oxazoline;
2-heptadecenyl-4,4-bis(oleyloxymethyl)-2-oxazoline.

The Group II oxazolines and imidazolines suitable for the practice of this invention may be prepared by any suitable method, several of which are known. Commercial grade materials are generally satisfactory when available.

Generally, Group II oxazolines suitable for the practice of this invention can be prepared by reacting an amino alcohol corresponding to the formula

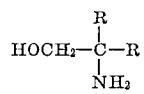

wherein R has the same meaning set forth above, with a saturated or unsaturated monocarboxylic acid having the formula R°CH₂COOH wherein R° can be H, alkyl or alkenyl of from 1 to about 20 carbon atoms. This reaction is well known to those skilled in the art. When R, either or both, is hydroxyalkyl, the use of one or two additional moles of acid per mole of oxazoline will provide the ester of the hydroxyalkyl group (or groups as the case may be). It is also known to prepare, in a two-step process, esters from acids other than the one used to form the oxazoline.

Generally, the Group II imidazolines can be prepared by known methods by reacting a diamine of the general formula

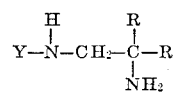

wherein R is generally alkyl and Y has the same meaning set forth above, with a saturated or unsaturated monocarboxylic acid having the formula R°CH₂COOH wherein R° can be H, alkyl or alkenyl of from 1 to about 20 carbon atoms.

Suitable organic carbonyl compounds include aromatic and aliphatic aldehydes, for instance those containing generally from about 1 to 15 carbon atoms, e.g. lower alkanals. Among the suitable compounds are formaldehyde, including paraformaldehyde, acetaldehyde, benzaldehyde, parachlorobenzaldehyde, ortho-chlorobenzaldehyde, para-bromobenzaldehyde, para-fluorobenzaldehyde, para-iodobenzaldehyde, para-hydroxybenzaldehyde, para-dimethylaminobenzaldehyde, and metanitrobenzaldehyde. Commerical grade materials, when available, are generally satisfactory.

In a preferred embodiment of the second object of this invention, the vinyl oxazolines and imidazolines are prepared from the alkanolamine and monocarboxylic acid without isolation of intermediates. In this process the oxazolines and imidazolines of Group II are formed according to the description of Purcell, U.S. Pat. 3,248,397. The reaction is conducted in a reaction vessel fitted with a reflux condenser and a take-off head. In this reaction 2 moles of water are eliminated per mole of azoline, and if there are additional hydroxy groups to be esterified, an additional mole of water will be eliminated for for each esterification. After formation of the azoline or azoline ester, formaldehyde is added, but in place of the 1:1 mole ratio described by Purcell, about 2 moles of formaldehyde from a formaldehyde source, e.g. paraformaldehyde, per mole of Group II oxazoline or imidazoline are added. Preferably an excess of up to one mole of formaldehyde is employed to ensure complete reaction, so that the total amount of formaldehyde may be as high as 3 moles. The mixture is then heated in accordance with the first object of this invention as described above to effect the production of the 2-[1,1-bis(hydroxymethyl)] compound. The temperature is then raised to above about 150° C., as previously set forth, and advantageously an acid catalyst can be added at this stage.

The amount of catalyst employed will depend upon the particular catalyst, however, these amounts will generally range from about 0.001 or 0.1 to 10 percent or more of the catalyst, preferably from about 0.5 to 5 percent based on the oxazoline. Suitable acid catalysts include organic and inorganic catalysts and include inorganic mineral acids such as sulphuric, hydrochloric and phosphoric acids, organic carboxylic and sulphonic acids, such as formic, benzenesulphonic, p-xylenesulphonic, p-toluenesulphonic, naphthalenesulphonic acids, inorganic and organic salts, such as sodium bisulphate, primary ammonium phosphate, calcium chloride, zinc chloride, aluminum chloride, ammonium chloride, ammonium bromide, hydroxylammonium chloride, boron trifluoride, and boron trifluoride-ether complex and halogen, such as iodine, and inorganic metal oxides, such as thorium dioxide. Iodine, p-xylenesulphonic acid, zinc chloride and sodium bisulphate have been found to be particularly advantageous as catalysts.

The reaction can also be carried out in the presence of solvents, for example hydrocarbons, such as hexane, octane, benzene, xylene, etc.; ethers such as dioxane; halogenated hydrocarbons, etc. Some of the solvents can also be advantageously used as azeotropic agents to aid in the removal of the water resulting from the reaction.

In the reaction it is generally advantageous to include a polymerization inhibitor in the reaction mixture to prevent the formation of polymeric products when the monomer is desired. It is, therefore, desirable to use oxazolines containing such an inhibitor or to add polymerization inhibitors like di-beta-naphthol, hydroquinone, p - hydroxydiphenylamine, N,N' - diphenyl-phenylenediamine, 2,5-di-tert-butylhydroquinone, trinitrotoluene, copper carbonate, or methylene blue. The preferred inhibitor is 2,5-di-tert-butylhydroquinone. These inhibitors have been found particularly effective for this purpose, and other similar inhibitors are well known in the art. The inhibitor should be used in an amount from about 0.1 to about 10%, preferably from about 0.5 to about 5% by weight based on the oxazoline or imidazoline.

The crude pot residue containing the product is satisfactory for most uses without purification. If preferred, however, the product can be purified by distillation at low pressure, e.g. at a presusre of about 20 mm. or less. Purities of 98% by weight of vinyl oxazoline or higher, can thus be obtained. In some instances the compounds of this invention can also be purified by recrystallization from a suitable solvent.

The following examples will serve to illustrate the invention. Temperatures are given in centigrade.

EXAMPLE 1

2 - (1-methyl-2-hydroxyethyl)-4,4-dimethyl-2-oxazoline is prepared as follows:

A mixture of 130 g. of 2-ethyl-4,4-dimethyl-2-oxazoline (Compound I) with 33 g. of paraformaldehyde was heated at 99 to 105° for 8 hours. Benzene (50 ml.) was added and the mixture was heated for 8 hours at 107 to 124° with azeotropic removal of 2.2 ml. of water. Distillation yielded 94 g. of product, B.P. 97 to 115°/20 mm., which solidified on cooling.

*Analysis.*—Calc'd for $C_8H_{15}NO_2$: Neutralization equivalent, 157.2; nitrogen 8.91%. Found: Neutralization equivalent, 160.7; nitrogen 8.45%.

Infrared absorption spectrum confirmed the presence of a hydroxyl group and of an oxazoline type of structure. The yield was 58.5%.

The product of this example is employed as a pigment grinding assistant for hydrophilic pigments by adding 0.5% by weight based on the weight of the pigment to the pigment grinding mixture.

A higher boiling product (16.4 g., B.P. 115–138° at 20 mm.) was also obtained in this experiment. It had a neutralization equivalent of 181.4 and was identified as 2 - [1,1-bis(hydroxymethyl)ethyl]-4,4-dimethyl-2-oxazoline.

EXAMPLE 2

2 - (1 - phenyl-2-hydroxyethyl)-4-methyl-4-hydroxymethyl-2-oxazoline is prepared by essentially the same procedure used in Example 1 except 2-benzyl-4-methyl-4-hydroxymethyl-2-oxazoline is substituted for Compound I.

EXAMPLE 3

2 - (1 - methyl - 2 - hydroxypropyl)-4,4-bis(hydroxymethyl)-2-oxazoline is prepared by essentially the same procedure used in Example 1 except 2-ethyl-4,4-bis(hydroxymethyl)-2-oxazoline is substituted for Compound I and acetaldehyde is substituted for paraformaldehyde.

EXAMPLE 4

2 - (1 - methyl - 2-phenyl-2-hydroxyethyl)-4,4-dimethyl-2-oxazoline is prepared by essentially the same procedure used in Example 1 except benzaldehyde is substituted for paraformaldehyde.

EXAMPLE 5

2 - (2 - hydroxyethyl)-4,4-dimethyl-2-oxazoline is prepared by essentially the same procedure used in Example 1 except 2,4,4-trimethyl-2-oxazoline is substituted for Compound I.

EXAMPLE 6

2 - (1-methyl-2-hydroxyethyl)-2-oxazoline is prepared by essentially the same procedure used in Example 1 except 2-ethyl-2-oxazoline is substituted for Compound I.

EXAMPLE 7

Essentially the same procedure used in Example 1 is followed except 2-(1-methylethyl)-4,4-dimethyl-2-oxazoline is substituted for Compound I and benzaldehyde is substituted for paraformaldehyde to produce 2-(1,1-dimethyl-2-phenyl-2-hydroxyethyl) - 4,4-dimethyl-2-oxazoline.

EXAMPLE 8

2 - [1,1 - bis(hydroxymethyl)ethyl]-4,4-dimethyl-2-oxazoline was prepared as follows:

A mixture of 258.6 g. (about 2 moles) of 2-ethyl-4,4-dimethyl-2-oxazoline and 140 g. (about 5 moles of formaldehyde equivalent) of paraformaldehyde was heated at 95 to 121° for 6.5 hours. The mixture was cooled somewhat and benzene, 400 ml., was added and the mixture was heated to boiling, filtered, and cooled to room temperature. The solid which separated was collected and dried. It weighed 237 g., M.P. 98–100° C. The neutral equivalent was 190.2, theoretical 187.3. The infrared spectrum was consistent with the proposed structure.

The product is useful as an auxiliary emulsifying agent in the preparation of self-emulsifying oil-based products.

EXAMPLE 9

2 - [tris(hydroxymethyl)methyl]-4,4-dimethyl-2-oxazoline was prepared essentially according to the experiment of Example 8 except that 2,4,4-trimethyl-2-oxazoline, 114 g., and paraformaldehyde, 100 g. were used as the reactants. The mixture was heated at 73° C. to 125° C. for about 5.5 hours. The residue product set up as a hard glass on cooling.

EXAMPLE 10

2 - [tris(hydroxymethyl)methyl]-4,4-bis(hydroxymethyl)-2-oxazoline is prepared essentially according to the procedure of Example 8 except that the oxazoline employed is 2-ethyl-4,4-bis(hydroxymethyl)-2-oxazoline, 2 moles with about 210 g. paraformaldehyde, 6 moles formaldehyde equivalent.

EXAMPLE 11

2-[1,1-bis(hydroxymethyl)heptadecenyl] - 4,4-dimethyl-2-oxazoline was prepared essentially according to the procedure of Example 8 except that the oxazoline employed was 2-heptadecenyl-4,4-dimethyl-2-oxazoline.

EXAMPLE 12

1-isopropyl - 2 - (1-methyl-2-hydroxyethyl) - 4,4 - dimethyl-2-imidazoline is prepared essentially according to the procedure of Example 1 except that 1-isopropyl-2-ethyl-4,4-dimethyl-2-imidazoline is employed in place of the oxazoline. The product is used as a corrosion inhibitor in an anti-rust oil by incorporating about 0.1% by weight in the oil.

EXAMPLE 13

1 - phenyl - 2 - [1,1-bis(hydroxymethyl)ethyl]-4,4-dimethyl-2-imidazoline is prepared essentially according to the procedure of Example 8 except that 1-phenyl-2-ethyl-4,4-dimethyl-2-imidazoline is employed in place of the oxazoline. The resulting product is useful as an auxiliary emulsifying agent.

EXAMPLE 14

1 - (2-hydroxyethyl) - 2 - [1,1-bis(hydroxymethyl)-ethyl]-4,4-dimethyl-2-imidazoline is prepared essentially according to the procedure of Example 8 except that 1-(2-hydroxyethyl) - 2 - ethyl-4,4-dimethyl-2-imidazoline is employed in place of the oxazoline.

EXAMPLE 15

2 - [1,1-bis(hydroxymethyl)heptadecenyl] - 4,4 - bis-(octadecenoxymethyl)-2-oxazoline was prepared essentially according to the procedure of Example 8 except that the oxazoline employed was the oleic acid diester of 2-heptadecenyl-4,4-bis(hydroxymethyl)-2-oxazoline.

EXAMPLE 16

2 - [1,1-bis(hydroxymethyl)ethyl] - 4 - ethyl - 4 - propionoxymethyl-2-oxazoline was prepared essentially according to the procedure of Example 8 except that the oxazoline employed was 2,4-diethyl-4-propionoxymethyl-2-oxazoline. The product was a crystalline solid, M.P. 49.5–51° C. The infrared and NMR spectra were compatible for the proposed structure.

EXAMPLE 17

2 - isopropenyl - 4 - ethyl - 4 - propionoxymethyl-2-oxazoline was prepared by heating in a reaction vessel equipped with a reflux condenser and a decanter head 110 g. (0.5 mole of 97%) of 2,4-diethyl-4-propionoxymethyl-2-oxazoline and 37 g. (1.1 mole) of paraformaldehyde to 120° C. for about one hour. During this time the paraformaldehyde dissolved in the reaction mixture. 2,5-di-tert-butylhydroquinone, 2 g. and thorium dioxide, 1 g., were then added and the temperature was raised to 160° C. Xylene was added, sufficient to maintain the temperature between 160 and 170° C. for the remainder of the heating period of about 4 hours. The water of reaction and released formaldehyde were removed through the decanter head. When it became evident that no more water was being released, it was determined that the reaction was complete.

The crude reaction mixture was distilled through a Snyder 6 cap column. A distillate of 97 g. was obtained with a residue of 23.1 g. Gas chromatograph analysis of the distillate showed 90.6% vinyl oxazoline ester, 4.8% oxazoline ester, and 3.1% vinyl oxazoline.

EXAMPLE 18

1-isopropyl-2-isopropenyl-4,4-dimethyl-2-imidazoline is prepared by repeating the experiment of Example 17 except that 1-isopropyl-2-ethyl-4,4-dimethyl-2-imidazoline, 0.5 mole, is substituted for 2,4-diethyl-4-propionoxymethyl-2-oxazoline.

EXAMPLE 19

2 - (1-ethenyl-heptadecenyl) - 4,4 - bis(octadecenoxymethyl)-2-oxazoline was prepared according to the experiment of Example 17 except that the oleic acid diester of 2-heptadecenyl-4,4-bis(hydroxymethyl)-2-oxazoline, 0.5 mole, was substituted in place of 2,4-diethyl-4-propiononxymethyl-2-oxazoline. High conversion of the vinyl oxazoline was obtained.

I claim:

1. A compound having the formula

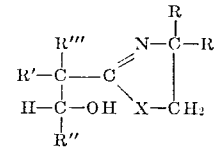

where R is selected from the group consisting of hydrogen, alkyl of from 1 to about 3 carbon atoms, hydroxyalkyl of from 1 to about 3 carbon atoms and saturated or unsaturated monocarboxylic acid esters thereof, said monocarboxylic acid corresponding to the formula

R°CH$_2$COOH

R° is hydrogen, alkyl of from 1 to about 20 carbon atoms or alkenyl of from 1 to 20 carbon atoms; R' is hydroxyalkyl of from 1 to about 3 carbon atoms, or phenyl; R" is selected from the group consisting of hydrogen, methyl, or phenyl; R''' is hydrogen or hydroxyalkyl of from 1 to 2 carbon atoms; and

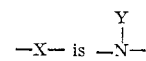

wherein Y is alkyl of from 1 to about 3 carbon atoms, hydroxyalkyl of from 1 to 3 carbon atoms or phenyl.

2. A compound having the formula

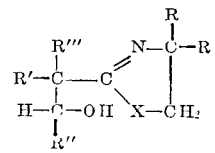

where R is selected from the group consisting of hydrogen, alkyl of from 1 to about 3 carbon atoms, hydroxyalkyl of from 1 to about 3 carbon atoms and saturated or unsaturated monocarboxylic acid esters thereof, said monocarboxylic acid corresponding to the formula

R°CH$_2$COOH

R° is hydrogen, alkyl of from 1 to about 20 carbon atoms or alkenyl of from 1 to 20 carbon atoms; R' is hydroxyalkyl of from 1 to about 3 carbon atoms; R'' is hydrogen; R''' is hydroxyalkyl of from 1 to 2 carbon atoms; and —X— is selected from the group consisting of

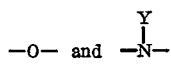

wherein Y is alkyl of from 1 to about 3 carbon atoms, hydroxyalkyl of from 1 to 3 carbon atoms or phenyl.

References Cited

UNITED STATES PATENTS

| 2,372,409 | 3/1945 | Tryon | 260—307 |
| 2,636,038 | 4/1953 | Brandner | 260—307 |
| 2,559,440 | 7/1951 | Jordan et al. | 260—404.5 |

ALEX MAZEL, Primary Examiner

R. V. RUSH, Assistant Examiner

U.S. Cl. X.R.

252—357, 390, 392; 260—309.6